United States Patent [19]

Ito et al.

[11] Patent Number: 4,884,162

[45] Date of Patent: Nov. 28, 1989

[54] METHOD AND APPARATUS FOR PREVENTING THE OVERHEAT OF A LINE FEED MOTOR FOR A PRINTER

[75] Inventors: Toshikazu Ito; Toshiro Suemune; Katsuhiko Sato, all of Tokyo, Japan

[73] Assignee: Oki Electric Industry Co., Ltd., Tokyo, Japan

[21] Appl. No.: 224,001

[22] Filed: Jul. 25, 1988

[30] Foreign Application Priority Data

Jul. 24, 1987 [JP] Japan .................................. 62-183732

[51] Int. Cl.$^4$ .............................................. H02H 6/00
[52] U.S. Cl. ........................................ 361/23; 361/28; 361/31; 361/78; 318/603; 388/912; 388/934; 388/811
[58] Field of Search .................... 361/25, 28, 23, 29, 361/74, 78, 89, 31, 94, 103; 318/434, 39, 603, 334; 307/141.8

[56] References Cited

U.S. PATENT DOCUMENTS

| | | | |
|---|---|---|---|
| 3,860,861 | 1/1975 | Gucker | 318/334 |
| 4,524,368 | 6/1985 | Inui et al. | 219/216 PH |
| 4,541,747 | 9/1985 | Imaizumi et al. | 318/334 |
| 4,611,155 | 9/1986 | Kurakake | 318/603 |
| 4,638,329 | 1/1987 | Nakayama et al. | 346/76 PH |
| 4,649,401 | 3/1987 | Kojima et al. | 364/519 |
| 4,663,734 | 5/1987 | Berry | 364/900 |
| 4,688,051 | 8/1987 | Kawakami et al. | 364/519 |

Primary Examiner—Todd E. Deboer
Attorney, Agent, or Firm—Wenderoth, Lind & Ponack

[57] ABSTRACT

A method and apparatus prevents the overheating of a line feed motor used in a printer. First and second timers are respectively provided to measure first and second time intervals. The second time interval includes a cessation period in which the line feed motor is not driven to allow for heat dissipation of the line feed motor. At the end of the first time interval, a determination is made as to whether the number of line feed pulses during the first time interval exceeds a predetermined limit. If the number of line feed pulses does not exceed the predetermined limit, the first time is reactivated. If the number of line feed pulses does exceed the predetermined limit, then the second timer is activated to allow for heat dissipation of the line feed motor.

2 Claims, 4 Drawing Sheets

METHOD AND APPARATUS FOR PREVENTING THE OVERHEAT OF A LINE FEED MOTOR FOR A PRINTER

BACKGROUND OFF THE INVENTION

1. Field of the Invention

The present invention relates to a method and apparatus for preventing the overheating of a line feed motor for a printer due to line feed operation of printing paper.

2. Related Art

The following measures have been taken as methods of preventing the overheating of a line feed motor (hereinafter referred to as "LF motor") incorporated into a printer.

(1) Using a motor having a high rating, or using a motor provided with radiation fins to radiate heat so that the temperature of the motor will not exceed the rated temperature even if the motor is driven continuously during a continual line feed operation.

(2) Warning the operator in the operation manual of the printer that continual line feed operation for an extended period of time is forbidden.

(3) Detecting the temperature of the motor using a heat sensitive element and adding a necessary period of cessation to a motor driving cycle to enable the motor to cool when the temperature increases beyond an upper limit, as disclosed in Japanese Patent Publication No. 57-11041.

(4) Counting the number of line feed pulses representing the frequency of line feed operation in a fixed time limited by a timer and adding a period of cessation to the motor driving cycle to enable the motor to cool when the number of line feed pulses in a fixed time exceeds a fixed value.

These measures, however, have the following problems.

Measure (1) is planned against troubles which will not occur even if the motor is driven continuously for a long time which is scarcely necessary in ordinary operation of the printer and is never an efficient measure or, more properly, the measure provides the printer with unnecessarily high quality and increases the manufacturing cost.

Measure (2) is unable to prevent the overheating of the motor if the operator neglects the instructions or if the host computer controlling the printer malfunctions.

Measure (3) requires a heat sensitive element, which increases the cost of the printer.

Measure (4) adds a period of cessation to the motor driving cycle when the number of line feed pulses in a fixed time representing the frequency of line feed operation exceeds a fixed value, however, the measure does not take heat generated by the motor during acceleration and deceleration into consideration and hence lacks practical effect in preventing the overheating of the motor, because the current supplied to the motor for acceleration or deceleration is greater than that supplied to the motor during operation at a constant speed and hence increased heat is generated during acceleration and deceleration.

SUMMARY OF THE INVENTION

Accordingly, it is an object of the present invention to provide a method and apparatus for preventing the overheating of a LF motor for a printer, which is capable of effectively preventing the overheating of the LF motor and eliminating the drawbacks of the foregoing known measures.

To achieve the object of the present invention, the present invention provides an apparatus for preventing the overheating of a LF motor for a printer, employing: a first timer for measuring a predetermined first time interval $t_1$; a second timer for measuring a predetermined second time interval $t_2$; a counting and calculating means for counting line feed pulses representing the frequency of the line feed operation while the first timer is measuring the first time interval $t_1$ or the second timer is measuring the second time interval $t_2$, and for adding the number of line feed pulses and the number of line feed pulses corresponding to the quantity of heat generated by the LF motor during acceleration and deceleration to the previous sum of line feed pulses, to obtain a new sum of line feed pulses; a holding means for subtracting a predetermined first allowable number of line feed pulses for the first time interval $t_1$ from the sum of line feed pulses and for holding the difference between the first allowable number of line feed pulses and the sum of line feed pulses as a new sum of line feed pulses; and a holding means for subtracting a predetermined second allowable number of line feed pulses for the second time interval $t_2$ from the sum of line feed pulses and for holding the difference between the second allowable number of line feed pulses and the sum of line feed pulses as a new sum of line feed pulses. Furthermore, the present invention provides a method for preventing the overheating of a LF motor for a printer including a first and second timer, counting and calculating means, and holding means, comprising the steps of: setting the sum of line feed pulses at zero and starting the first timer upon the connection of the printer to a power supply; subtracting the first allowable number of line feed pulses from the sum of line feed pulses at the end of the first time interval $t_1$; setting the sum of line feed pulses at zero and starting the first timer again, when the result of the subtraction is zero or a negative value; starting the second timer when the result of the subtraction in the preceding step is neither zero nor a negative value; subtracting the second allowable number of line feed pulses for the second time interval $t_2$ from the sum of line feed pulses; starting the second timer again when the result of the subtraction in the preceding step is zero or a negative value; and providing a period of cessation according to the number of line feed pulses only during the time interval counted by the second timer before actuating the LF motor.

According to the present invention, the first timer is started upon the connection of the printer to the power supply, and then a decision is made as to whether or not the sum of line feed pulses is greater than a predetermined value at the end of a predetermined time interval measured by the first timer. When the decision result is NO, the first timer is restarted, and when the decision result is YES, the second timer is started and a period of cessation is added to the time interval measured by the second timer before actuating the LF motor. At the end of the time interval measured by the second timer, a decision is made as to whether or not the sum of line feed pulses is greater than a predetermined value. When the decision result is NO, the first timer is started, and when the decision result is YES, the second timer is restarted. During the operation of the second timer, the predetermined period of cessation is provided. Thus, the overheating of the LF motor is prevented.

The quantity of heat generated by the LF motor in feeding lines in the line feed mode is greater than that in feeding the same number of lines in the form feed mode, because acceleration and deceleration are repeated every line feed cycle in the line feed mode. Therefore, according to the present invention, the number of line feed pulses $N_{LFACC}$ corresponding to the quantity of heat generated by the LF motor during acceleration and deceleration is added to the sum of line feed pulses to enhance the reliability of the control operation for preventing the overheating of the LF motor. In the above description, assuming $t_1 > t_2$, the following effect can be assured. Namely, it is piecemeal judged whether or not the quantity of heat generated by the LF motor becomes less than a prescribed one, for improving the throughput.

The above and other objects, features and advantages of the present invention will become more apparent from the following description taken in conjunction with the accompanying drawings.

DESCRIPTION OF THE PREFERRED EMBODIMENT

Figure 1:
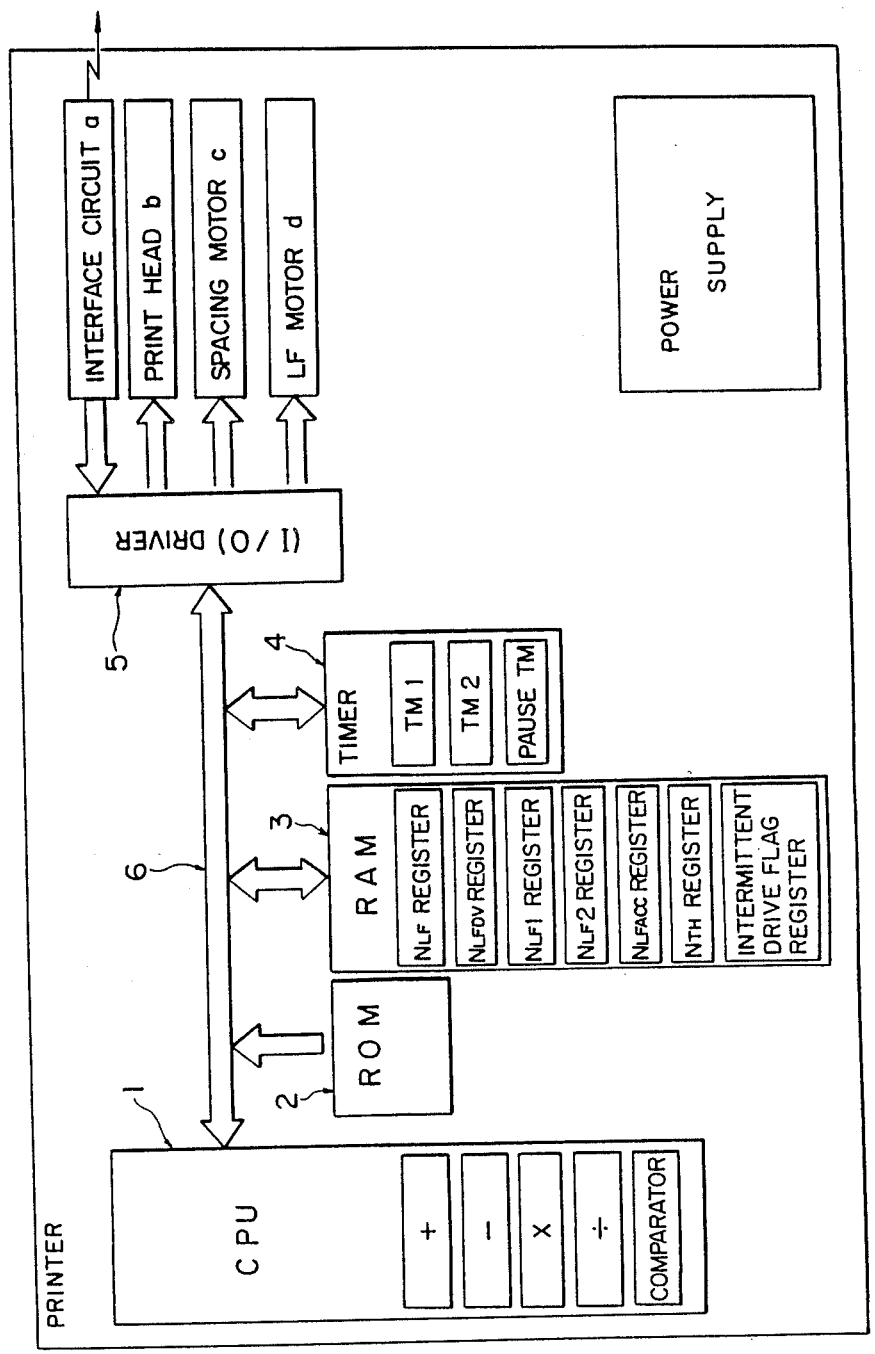
FIG. 1 is a block diagram of a control unit for controlling a printer.

Shown in FIG. 1 is a control unit for controlling a printer, comprising a central processing unit (hereinafter abbreviated to "CPU") 1 including counting and calculating means, a read-only memory (hereinafter abbreviated to "ROM") 2 for storing control programs and fixed data, a random access memory (hereinafter abbreviated to "RAM") 3 as a holding means for storing input data, etc., timers 4 (a first timer $TM_1$ and a second timer $TM_2$), an I/O driver 5 which processes data in accordance with instructions given thereto from the CPU 1, and a bus line 6.

The I/O driver 5 is connected to external devices including an interface circuit a, a print head b, a spacing motor c, and a LF motor d.

In operation, the CPU 1 receives print data such as character codes, and control data, namely, control codes including those representing a character pitch and a line pitch through the I/O driver 5 from the interface circuit a. Then, the CPU 1 stores the received data in the RAM 3. Upon the reception of all the data for one line, the CPU 1 actuates the spacing motor c through the I/O driver 5. Then, the CPU 1 reads the print data from the RAM 3, converts the print data into corresponding dot pattern signals, and then sends the dot pattern signals through the I/O driver 5 to the print head b. Then, the print head operates according to the dot pattern signals for printing at a predetermined point in time.

Upon the completion of printing operation for one line, the CPU 1 actuates the LF motor d through the I/O driver 5 for line feed. When a stepping motor is employed as the LF motor, timing of the angular stepping motion of the LF motor d is determined by the timer 4 under the control operation of the CPU 1.

A method of preventing the overheating of the LF motor d will be described specifically hereinafter with reference to flow charts shown in FIGS. 2(A), 2(B) and 2(C), and a time chart shown in FIG. 3.

Figure 3:
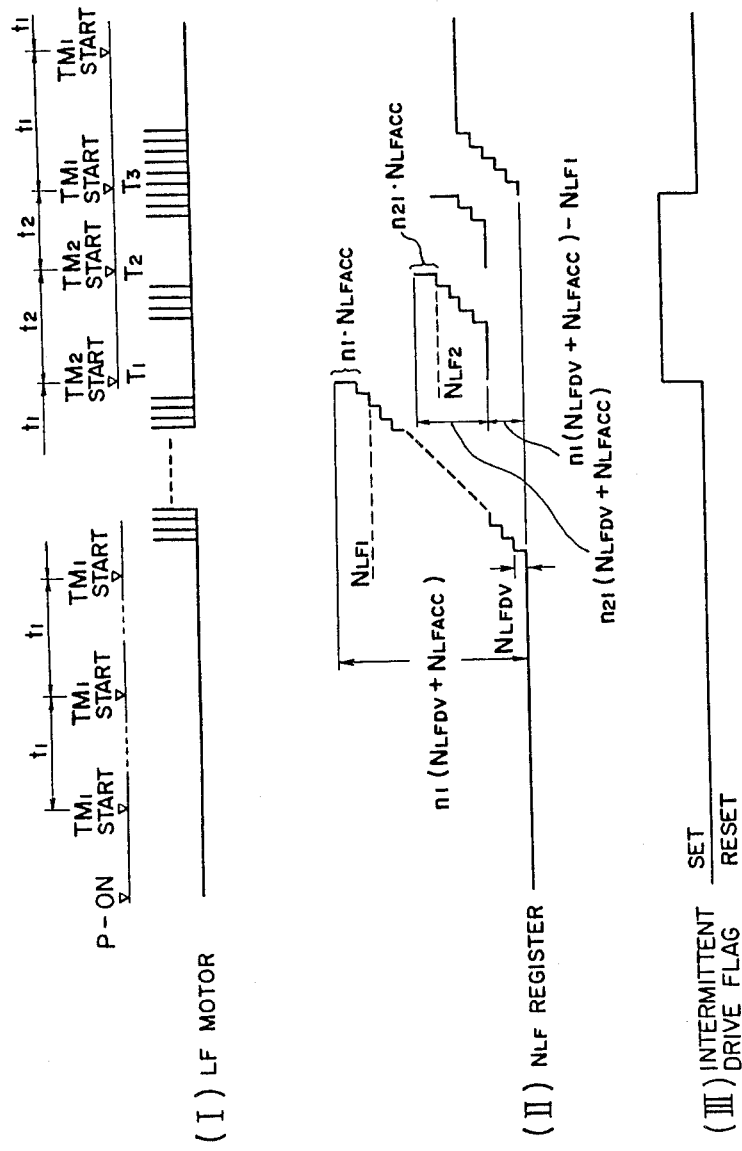
FIG. 3 is a time chart explaining a mode of driving a LF motor according to the present invention.

Referring to FIG. 3, upon the connection of the printer to a power supply at a time P-ON (diagram (I)), the registers (an $N_{LF}$ register for storing the sum $N_{LF}$ of line feed pulses, $N_{LFDV}$, $N_{LF1}$ and $N_{LF2}$ registers respectively for storing the numbers $N_{LFDV}$, $N_{LF1}$ and $N_{LF2}$ of line feed pulses, an $N_{LFACC}$ register for storing the number $N_{LFACC}$ of line pulses representing the heat generated by the LF motor d during acceleration and deceleration, and an $N_{TH}$ register for storing a reference number $N_{TH}$ of line feed pulses for deciding a cessation time, and an intermittent drive flag register) are initialized, and the first timer $TM_1$ is started.

Figure 2A:
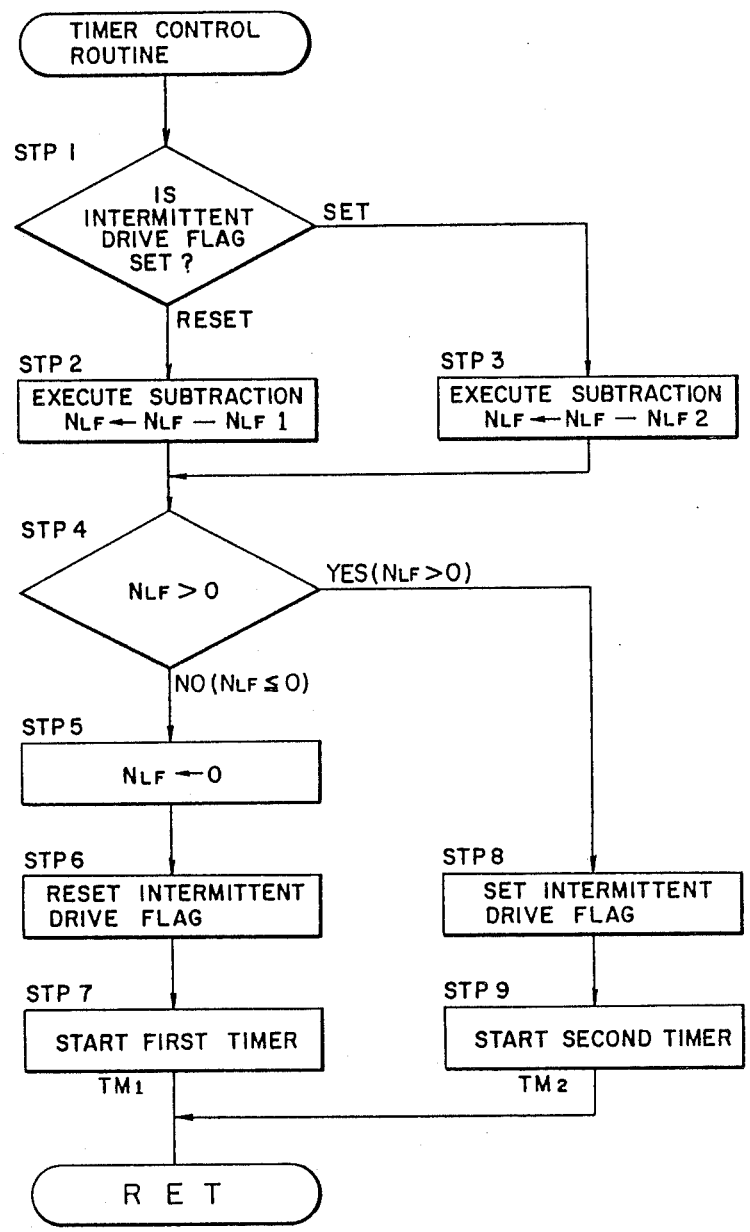
FIGS. 2(A), 2(B) and 2(C) are flow charts explaining a mode of driving a LF motor according to the present invention.

At the end of a time interval $t_1$ measured by the first timer $TM_1$, a timer control routine shown in FIG. 2(A) is started. In STP 1, a decision is made whether or not the flag of the intermittent drive register is set. Since the flag is not set at this stage, the routine goes to STP 2. In STP 2, the value $N_{LF1}$ stored in the $N_{LF1}$ register is subtracted from the value $N_{LF}$ stored in the $N_{LF}$ resiter, and then the remainder $(N_{LF} - N_{LF1})$ is stored in the $N_{LF}$ register. The number $N_{LF1}$ of line feed pulses stored in the $N_{LF1}$ register is an allowable number of line feed pulses within the time interval $t_1$ measured by the first timer $TM_1$ for which the LF motor d is allowed to operate continuously. The number $N_{LF2}$ of line feed pulses stored in the $N_{LF2}$ register is the allowable number of pulses within a time interval $t_2$ measured by the second timer $TM_2$ for which the LF motor d is allowed to operate continuously.

In STP 4, a decision based on a comparator is made as to whether the value stored in the $N_{LF}$ register is zero or less. When the decision result is NO ($N_{LF} \leq 0$) the routine goes to STP 5, in which the $N_{LF}$ register is reset, and then the intermittent drive flag register is reset in STP 6. In STP 7, the first timer $TM_1$ is restarted. At the end of the predetermined time interval $t_1$ measured by the first timer $TM_1$, the routine returns to STP 1 to repeat the timer control routine.

Figure 2B:
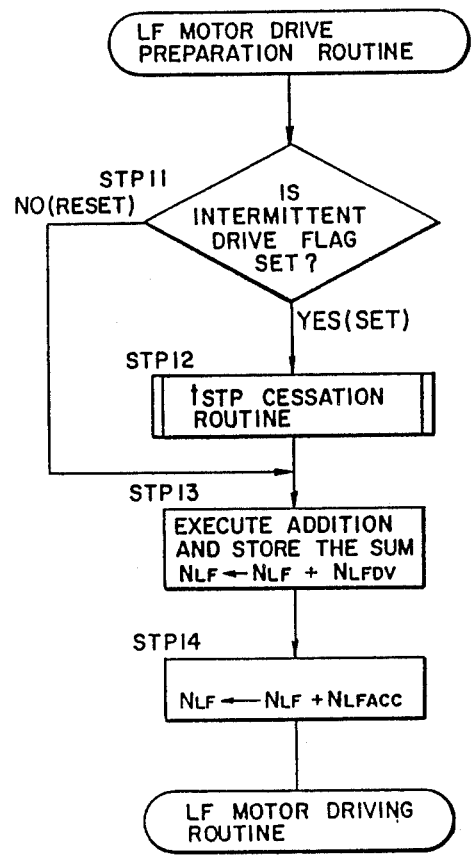
Figure 2C:
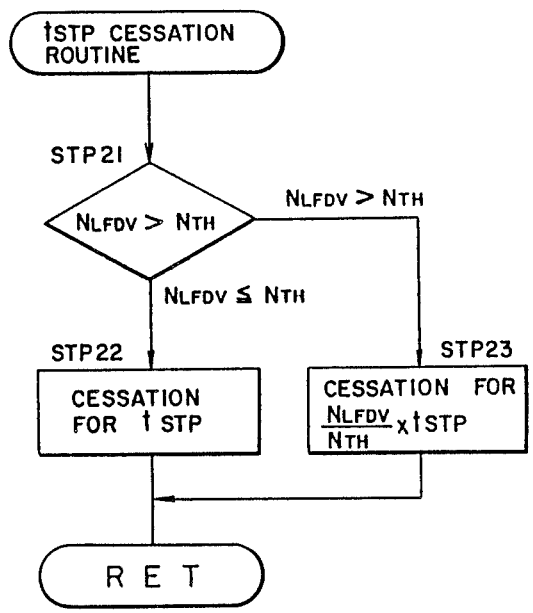

When the LF motor d is required to operate during the repetition of the timer control routine, the following LF motor drive preparation routine shown in FIG. 2(B) is always executed before actuating the LF motor d.

Referring to FIG. 2(B), a decision is made in STP 11 as to whether or not the flag of the intermittent drive flag register is set. When the decision results in STP 11 is NO (RESET), the routine goes to STP 13. In STEP 13, the value $N_{LFDV}$ stored in the $N_{LFDV}$ register is added to the value $N_{LF}$ stored in the $N_{LF}$ register, and then the sum $(N_{LF} + N_{LFDV})$ is stored in the $N_{LF}$ register. The value $N_{LFDV}$ stored in the $N_{LFDV}$ register is the number of line feed pulses generated when line feed operation is implemented. Then, the routine goes to STP 14, where the value $N_{LFACC}$ stored in the $N_{LFACC}$ register is added to the value $N_{LF}$ stored in the $N_{LF}$ register, and then the sum $(N_{LF} + N_{LFACC})$ is stored in the $N_{LF}$ register. The value $N_{LFACC}$ is the number of line feed pulses representing the heat generated by the LF motor during acceleration and deceleration for line feed operation. The LF motor is actuated after STP 14 has been executed. The foregoing steps, STP 11 through STP 14 are repeated.

When the LF motor d is driven continuously, the value stored in the $N_{LF}$ register varies as shown in diagram (II) in FIG. 3. Then, as shown in diagram (I) in FIG. 3, the timer control routine shown in FIG. 2(A) is started at time $T_1$ corresponding to the end of the time interval $t_1$ measured by the first timer $TM_1$. In this case, the timer control routine goes from STP 1 to STP 2, where the same subtraction is executed. By this time the value stored in the $N_{LF}$ register is increased to $n_1 \times (N_{LFDV} + N_{LFACC})$, where $n_1$ is the frequency of line feed cycles in the predetermined time interval $t_1$. Therefore, the sum $N_{LF}$ of line feed pulses is expressed by $$N_{LF} = n_1 \times (N_{LFDV} + N_{LFACC}) - N_{LF}1.$$

Suppose that the value stored in the $N_{LF}$ register has exceeded the value $N_{LF}1$ as shown in diagram (II) in FIG. 3, the decision result in STP 4 is YES ($N_{LF} < 0$), and hence the routine goes to STEP 8. In STP 8, the flag of the intermittent drive flag register is set as shown in diagram (III) in FIG. 3. Then, the second timer $TM_2$ is started in STP 9. When the LF motor drive preparation routine shown in FIG. 2(B) is started before actuating the LF motor d, the routine goes from STP 11 to STP 12 to execute a $t_{STP}$ cessation routine shown in FIG. 2(C), because the intermittent drive flag has been set. In STP 21, the value $N_{LFDV}$ is compared by the comparator with a value $N_{TH}$, namely, the number of line feed pulses determined through experiments. When $N_{LFDV} \leq N_{TH}$, STP 13 of the LF motor drive preparation routine is executed after a predetermined time interval $t_{STP}$ of cessation. When $N_{LFDV} < N_{TH}$, STP 13 of the LF motor drive preparation routine is executed after a time interval $(N_{LFDV}/N_{TH}) \times t_{STP}$. After adding the number of line feed pulses in STP 13, the routine goes to STP 14, where the value $N_{LFACC}$ stored in the $N_{LFACC}$ register is added to the value $N_{LF}$ stored in the $N_{LF}$ register. Thereafter, the foregoing procedure is executed before actuating the LF motor d.

At time $T_2$ corresponding to the end of the time interval $t_2$ measured by the second timer $TM_2$, the timer control routine shown in FIG. 2(A) is started again. Since the intermittent drive flag has previously been set, the routine goes from STP 1 to STP 3, where the subtraction of the line feed pulses is executed. At this time, the value stored in the $N_{LF}$ register is the sum of $n_1 \times (N_{LFDV} + N_{LFACC}) - N_{LF}1$ (the result of operation in STP 2 in the preceding control cycle) and $n_{21} \times (N_{LFDV} + N_{LFACC})$, where $n_{21}$ is the frequency of line feed operation in a time interval between the time $T_1$ and the time $T_2$. Therefore, the result of subtraction in STP 3, namely, the sum $N_{LF}$ of the number of line feed pulses obtained in STP 3, is $$N_{LF} = [n_1(N_{LFDV} + N_{LFACC}) - N_{LF}1] + [n_{21}(N_{LFDV} + N_{LFACC}) - N_{LF}2].$$

Suppose that the value stored in the $N_{LF}$ register has exceeded the value $N_{LF}2$ (diagram (II) in FIG. 3) before the time $T_2$ (FIG. 3). Then, the timer control routine shown in FIG. 2(A) goes from STP 4 through STP 8 to STP 9, the intermittent drive flag remains set, and the second timer $TM_2$ is started again. At time $T_3$ corresponding to the end of the predetermined time interval $t_2$ measured by the second timer $TM_2$, the timer control routine shown in FIG. 2(A) is started again. In this case, the routine goes from STP 1 to STP 3, where the subtraction of the number of line feed pulses is executed. The result of operation in STP 3, namely, the sum $N_{LF}$ obtained in STP 3 is expressed by $$N_{LF} = [n_1(N_{LFDV} + N_{LFACC}) - N_{LF}1] + [n_{21}(N_{LFDV} + N_{LFACC}) - N_{LF}2] + [n_{22}(N_{LFDV} + N_{LFACC}) - N_{LF}2] \tag{1}$$

where $n_{22}$ is the frequency of line feed operation between the time $T_2$ and time $T_3$.

Suppose that the value stored in the $N_{LF}$ register is less than the value $N_{LF}2$ as shown in diagram (II) in FIG. 3. Then, the decision in STP 4 is $N_{LF} \leq 0$, and hence the routine goes through STP 5 to STP 6, where the $N_{LF}$ register and the intermittent drive flag register are reset, and then the first timer $TM_1$ is started in STP 7.

In the exemplary mode of line feed operation explained hereinbefore with reference to FIG. 3, a condition: $N_{LF} \leq 0$ is obtained after repeating STP 3 of the timer control routine twice. If the condition: $N_{LF} \leq 0$ is obtained after repeating STP 3 i times, $N_{LF}$ is expressed by a generalized expression $$N_{LF} = [n_1(N_{LFDV} + N_{LFACC}) - N_{LF}1] + [n_{2k}(N_{LFDV} + N_{LFACC}) - N_{LF}2] \tag{2}$$

As apparent from the foregoing description, according to the present invention, the first timer is started upon the connection of the printer to the power supply, a decision is made at the end of a time interval measured by the first timer whether or not the sum of line feed pulses is greater than a predetermined first value, and when the sum of line feed pulses is not more than the first value, the first timer is started again. When the sum of line feed pulses is greater than the first value, the second timer is started, and a predetermined period of cessation is provided before actuating the LF motor during a time interval for which the second timer is set. At the end of the time interval measured by the second timer, a decision is made as to whether or not the sum of line feed pulses is greater than a predetermined second value, and when the sum of line feed pulses is not more than the second value, the first timer is started. When the sum of line feed pulses is greater than the second value, the second timer is started again. Thus, the predetermined period of cessation is provided by the cessation timer before actuating the LF motor during the time interval counted by the second timer. The LF motor driving period during the time interval counted by the second timer is greater than that during the time interval counted by the first timer, and the frequency of operation of the second timer is controlled according to the number of line feed pulses. Furthermore, since the number of line feed pulses includes the number of line feed pulses corresponding to the quantity of heat generated by the LF motor during acceleration and deceleration, the overheat of the LF motor can be prevented efficiently without entailing the excessive equipment of the printer and increase in the manufacturing cost of the printer.

Although the invention has been described in its preferred form with a certain degree of particularity, obviously many variations and changes are possible therein. It is therefore to be understood that the invention may be practiced otherwise than specifically described herein without departing from the scope and spirit thereof.

What is claimed is:

1. An apparatus for preventing the overheating of a line feed motor, said apparatus comprising:
   a first timer means for measuring a predetermined first time interval;

a second timer means for measuring a predetermined second time interval;

a counting and calculating means for counting a number of line feed pulses of said line feed motor during each of said first time interval and said second time interval, and for adding the thus counted number of line feed pulses to a previously updated sum of line feed pulses to obtain a new sum of line feed pulses at the end of each of said first time interval and said second time interval;

a first subtracting means for subtracting a first allowable line feed pulse number from said new sum of line feed pulses to obtain a newly updated sum of line feed pulses at the end of said first time interval;

a second subtracting means for subtracting a second allowable line feed pulse number from said new sum of line feed pulses to obtain said newly updated sum of line feed pulses at the end of said second time interval;

a control means for controlling activation of said line feed motor, for activating said first timer means, for determining whether said newly updated sum of line feed pulses at the end of said first time interval is a positive number, for reactivating said first time means when said newly updated sum of line feed pulses at the end of said first time interval is a nonpositive number, for activating said second timer means when said newly updated sum of line feed pulses at the end of said first time interval is a positive number, for determining whether said newly updated sum of line feed pulses at the end of said second time interval is a positive number, for activating said first timer means when said newly updated sum of line feed pulses at the end of said second time interval is a nonpositive number, and for reactivating said second timer means when said newly update sum at the end of said second time interval is a positive number;

wherein a cessation period for deactivation of said line feed motor is provided during a portion of said second time interval, whereby said cessation period allows for heat dissipation of said line feed motor.

2. A method of preventing the overheating of a line feed motor, said method comprising:
(a) setting a sum of line feed pulses to zero;
(b) activating a first timer for measuring a first time interval;
(c) counting a number of line feed pulses during said first time interval to obtain a first sum of line feed pulses;
(d) subtracting a first allowable number of line feed pulses to obtain a first difference at the end of said first time interval;
(e) repeating steps (a) through (d) when said first difference is a nonpositive number;
(f) activating a second timer when said first difference is a positive number, said second timer for measuring a second time interval, said second time interval having a cessation period in which said line feed motor is deactivated to allow for heat dissipation of said line feed motor;
(g) counting a number of line feed pulses during said second time interval to obtain a second sum of line feed pulses;
(h) adding said second sum of line feed pulses to said first sum of line feed pulses to obtain a new first sum of line feed pulses;
(i) subtracting a second allowable number of line feed pulses from said new first sum of line feed pulses to obtain a second difference at the end of said second time interval;
(j) repeating steps (a) through (i) when said second difference is a nonpositive number; and
(k) reactivating said second timer and repeating steps (g) through (i) when said second difference is a positive number.

* * * * *